C. A. ERWIN.
RESILIENT WHEEL.
APPLICATION FILED NOV. 27, 1915.
1,253,801.
Patented Jan. 15, 1918.
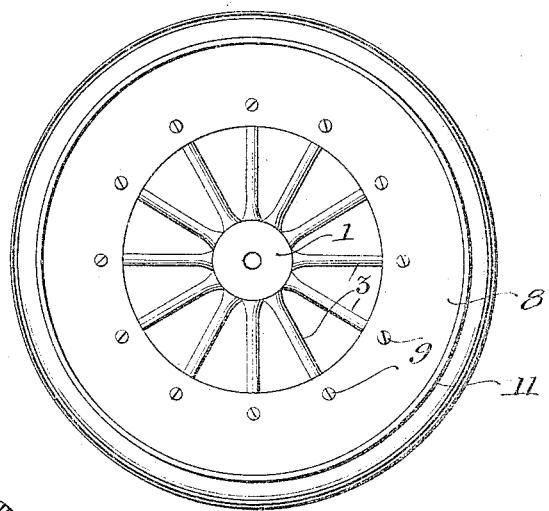
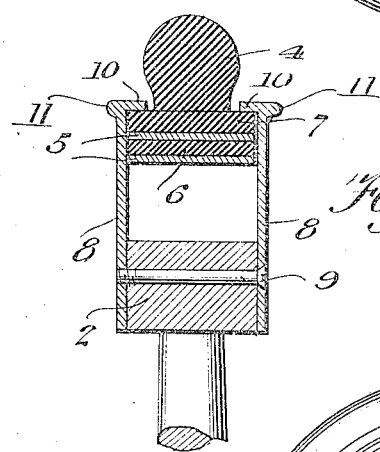
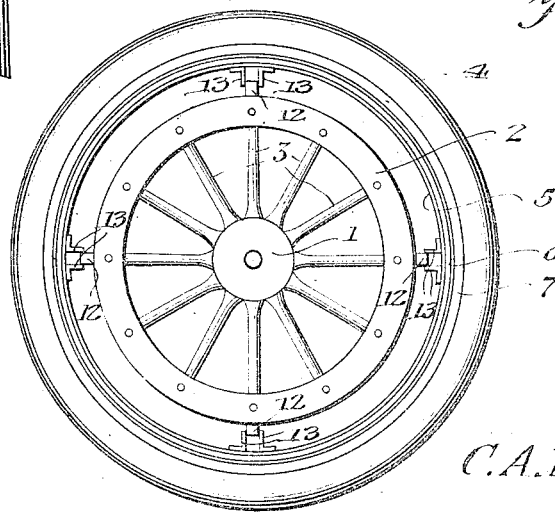

UNITED STATES PATENT OFFICE.

CHARLES A. ERWIN, OF MOBERLY, MISSOURI.

RESILIENT WHEEL.

1,253,801.  Specification of Letters Patent.  Patented Jan. 15, 1918.

Application filed November 27, 1915. Serial No. 63,792.

*To all whom it may concern:*

Be it known that I, CHARLES A. ERWIN, a citizen of the United States, residing at Moberly, in the county of Randolph and State of Missouri, have invented new and useful Improvements in Resilient Wheels, of which the following is a specification.

This invention relates to resilient vehicle wheels, the object in view being to produce a combined wheel and tire bearing such a relation to each other that a solid tire may be mounted upon the wheel and adapted to yield readily at any and all points in the tread thereof so as to absorb all ordinary road shocks and vibrations. The construction hereinafter particularly described and illustrated in the accompanying drawings does away entirely with the use of the ordinary supporting springs interposed between a fixed rim and a resilient or movable rim, the spring hoop or band performing its function perfectly without the aid of such devices.

With the above and other objects in view, the invention consists in the novel construction, combination and arrangement of parts, as herein described, illustrated and claimed.

In the accompanying drawings:—

Figure 1 is a side elevation of a wheel and tire embodying the present invention.

Fig. 2 is a similar view thereof with the adjacent retaining annulus removed.

Fig. 3 is an enlarged transverse section through the tire and wheel.

Referring to the drawings, the wheel body is of the ordinary construction comprising the hub 1, fixed rim or felly 2 and spokes 3 rigidly connecting the hub and felly or rim.

4 designates a tire which may either be of the solid or cushion type so as to do away with punctures, blow outs and the like and the trouble and annoyance incident to the use of pneumatic tires. The tire 4 is mounted upon a resilient support comprising a plurality of spring bands 5 the number of which may be increased as found expedient or as required by the size of the wheel and the weight or load to be imposed thereon. Cushioning strips or rings 6 of rubber, leather or analogous sound deadening material are interposed between said bands.

An annular strip or cushion 7 preferably of rubber or leather having the same properties as the rings 6 is interposed between the outer band 5 and the tire 4 and is of a width equal to that of the bands 5 and the strip or strips 6. The tire 4 may be fixedly secured to the strip 7 in any desired way.

Annular retainers 8 of metal are fastened to the opposite sides of the wheel body by means of bolts or screws 9 which are shown as penetrating the felly or rim 2 so that either or both of said retainers may be removed from the body of the wheel to allow of the removal of the tire and its supporting band or bands. Along their outer edges the retainers 8 are provided with inwardly extending flanges 10 within which the tire supporting band or bands are retained, thus permitting the tire supporting member to yield inwardly but restricting and limiting the outward movements thereof. As shown in the drawings, each of the annular retainers 8 is further provided on the outer peripheral edge thereof with an annular reinforcing flange 11.

From the foregoing description, taken in connection with the accompanying drawings, it will now be understood that the annular metal retainers 8 bear a fixed relation to the body of the wheel, and the tire and its supporting hoop or band are held in a certain normal relation to the body of the wheel by means of the inwardly extending peripheral flanges of the annular retainers. This allows the tire to be pressed inwardly at any point throughout the circumference thereof without disturbing any other portion of the tire and the tire automatically resumes its circular shape as the wheel revolves. The annular cushion 7 comes in direct contact with the flanges 10 of the retainers 8 and thereby absorbs all noise, making the wheel run quietly. Should it be found necessary, additional spring bands or hoops 5 may be placed within those above described and shown in the drawings to enable the wheel to sustain greater weight.

The fixed rim 2 is provided on the outer face thereof with driving lugs 12 and the inner spring hoop 5 is provided on the inner face thereof with complemental lugs 13 arranged in pairs, the lugs of each pair being located in spaced relation to each other to receive the lugs 12 and admit of a limited radial movement of the lugs 12 in relation to the lugs 13. In this manner driving power applied to the body of the wheel is transmitted to the tire carrying spring hoop and the tire carried thereby.

Having thus described my invention, I claim:—

A wheel body having a fixed rim, in combination with a resilient tread support arranged in spaced and normally concentric relation to said rim and comprising a plurality of endless and normally concentric spring bands of equal width and each in the form of a true circle, an annular cushion interposed between said concentric bands, a sound deadening endless cushioning ring surrounding the outer spring band and also in the form of a true circle, a tread mounted on said support, and annular tread supporting retainers secured in fixed relation to the wheel body and having marginal flanges which prevent lateral and limit outward radial movement of the tread support.

In testimony whereof I affix my signature in presence of two witnesses.

C. A. ERWIN.

Witnesses:
J. FRED HANNAH,
FRANK HALL.